(12) United States Patent
Peng et al.

(10) Patent No.: US 12,413,316 B2
(45) Date of Patent: Sep. 9, 2025

(54) CALIBRATION METHOD AND CALIBRATION SYSTEM FOR RADIO FREQUENCY TRANSCEIVER

(71) Applicant: Wistron NeWeb Corporation, Hsinchu (TW)

(72) Inventors: Chen-Shu Peng, Hsinchu (TW); Chih Yao Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 83 days.

(21) Appl. No.: 18/596,788

(22) Filed: Mar. 6, 2024

(65) Prior Publication Data

US 2024/0305388 A1    Sep. 12, 2024

(30) Foreign Application Priority Data

Mar. 9, 2023  (TW) .................. 112108781

(51) Int. Cl.
*H04B 17/11* (2015.01)
*H04B 17/00* (2015.01)
*H04B 17/21* (2015.01)

(52) U.S. Cl.
CPC ......... *H04B 17/11* (2015.01); *H04B 17/0087* (2013.01); *H04B 17/21* (2015.01)

(58) Field of Classification Search
None
See application file for complete search history.

(56) References Cited

U.S. PATENT DOCUMENTS

| | | | |
|---|---|---|---|
| 11,658,660 B1* | 5/2023 | Finck | G06N 10/20 327/527 |
| 2016/0072457 A1 | 3/2016 | Subrahmaniyan Radhakrishnan | |
| 2020/0388916 A1* | 12/2020 | Kahrizi | H01Q 3/267 |
| 2022/0255223 A1* | 8/2022 | Tran | G06V 20/52 |
| 2023/0038733 A1* | 2/2023 | Blin | H03F 3/245 |
| 2023/0057105 A1* | 2/2023 | Kulmer | G01S 7/40 |
| 2023/0163485 A1* | 5/2023 | Cameron | H01Q 1/38 343/702 |

* cited by examiner

*Primary Examiner* — Wilson Lee
(74) *Attorney, Agent, or Firm* — McClure, Qualey & Rodack, LLP

(57) ABSTRACT

A calibration method for a radio frequency (RF) transceiver and a calibration system thereof are provided. The calibration method includes configuring a controller to perform a first transmission test on the RF transceiver and generate a plurality of model test results for selecting a target calibration model from a plurality of reference calibration models to calibrate the RF transceiver; configuring the controller to perform a second transmission test on the RF transceiver and generate a plurality of parameter test results for selecting a target parameter set from a plurality of reference parameters to calibrate the RF transceiver; and configuring the controller to perform a third transmission test on the RF transceiver and generate a plurality of circuit test results for selecting a target simulation circuit from a plurality of reference simulation circuits to match the target simulation circuit to the RF transceiver.

20 Claims, 7 Drawing Sheets

CALIBRATION METHOD AND CALIBRATION SYSTEM FOR RADIO FREQUENCY TRANSCEIVER

RELATED APPLICATIONS

This application claims priority to Taiwan Application Serial Number No. 112108781, filed Mar. 9, 2023, which is herein incorporated by reference.

BACKGROUND

Technical Field

The present disclosure relates to the field of communication technology, and more particularly, to a calibration method and a calibration system for a radio frequency transceiver.

Description of Related Art

With the increasing demand for 5th generation mobile communication system (5G), related industries have proposed the open radio access network (O-RAN), which is used to improve the flexibility of 5G architecture and provide smart management. Remote radio units (RRUs) and small base stations used in O-RAN can use the ADRV902x series chips to perform Digital Pre-Distortion (DPD) calibration. The existing calibration method is performed by antenna engineers having to manually input multiple sets of calibration parameters to the test platform, and then verify and record the error vector magnitude (EVM) results corresponding to each set of calibration parameters.

The aforementioned manual operations are cumbersome and time-consuming, causing related industries to spend additional development costs on manpower. In addition, because the existing calibration method requires multiple manual comparisons and data verifications, the performance of the calibrated RRU products is inconsistent, so that they cannot all meet the specification requirements of the 3rd generation partnership project (3GPP). In view of this, a calibration method and a calibration system that can effectively reduce manual testing man-hours and improve RRU performance are needed by the market and related industry.

SUMMARY

According to one aspect of the present disclosure, a calibration method for a radio frequency transceiver includes a first calibration step, a second calibration step, and a circuit matching step. The first calibration step includes configuring a controller to execute a first calibration software module for performing a first transmission test on the radio frequency transceiver to generate a plurality of model test results so as to select a target calibration model from a plurality of reference calibration models, and to calibrate the radio frequency transceiver according to the target calibration model. The target calibration model corresponds to a lowest value among the plurality of model test results. The second calibration step includes configuring the controller to execute a second calibration software module for performing a second transmission test on the radio frequency transceiver to generate a plurality of parameter test results so as to select a target parameter set from a plurality of reference parameters, and to calibrate the radio frequency transceiver according to the target parameter set. The target parameter set corresponds to a value set of the plurality of parameter test results. The circuit matching step includes configuring the controller to execute a circuit matching software module for performing a third transmission test on the radio frequency transceiver to generate a plurality of circuit test results so as to select a target simulation circuit from a plurality of reference simulation circuits, and to match the radio frequency transceiver according to the target simulation circuit. The target simulation circuit corresponds to a lowest value among the plurality of circuit test results.

According to another aspect of the present disclosure, a calibration system for a radio frequency transceiver includes a radio frequency transceiver, a memory unit, and a controller. The memory unit is for storing a first calibration software module, a second calibration software module, a circuit matching software module, a plurality of reference calibration models, a plurality of first parameters, a plurality of second parameters, and a plurality of reference simulation circuits. The controller is connected to the memory unit and the radio frequency transceiver and configured to perform a first calibration step, a second calibration step, and a circuit matching step. In the first calibration step, the controller executes the first calibration software module for performing a first transmission test on the radio frequency transceiver to generate a plurality of model test results, selects a target calibration model from the plurality of reference calibration models, and calibrates the radio frequency transceiver according to the target calibration model. The target calibration model corresponds to a lowest value among the plurality of model test results. In the second calibration step, the controller executes the second calibration software module for performing a second transmission test on the radio frequency transceiver to generate a plurality of first test results and a plurality of second test results, selects a first target parameter from the plurality of first parameters and a second target parameter from the plurality of second parameters, and calibrates the radio frequency transceiver according to the first target parameter and the second target parameter. The first target parameter corresponds to a lowest value among the plurality of first test results, and the second target parameter corresponds to a lowest value among the plurality of second test results. In the circuit matching step, the controller executes the circuit matching software module for performing a third transmission test on the radio frequency transceiver to generate a plurality of circuit test results, selects a target simulation circuit from the plurality of reference simulation circuits, and matches the target simulation circuit to the radio frequency transceiver. The target simulation circuit corresponds to a lowest value among the plurality of circuit test results.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements can be represented by the same labels.

It will be understood that when an element (or device) is referred to as be "connected to" another element, it can be directly connected to the other element, or it can be indirectly connected to the other element, that is, intervening elements can be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
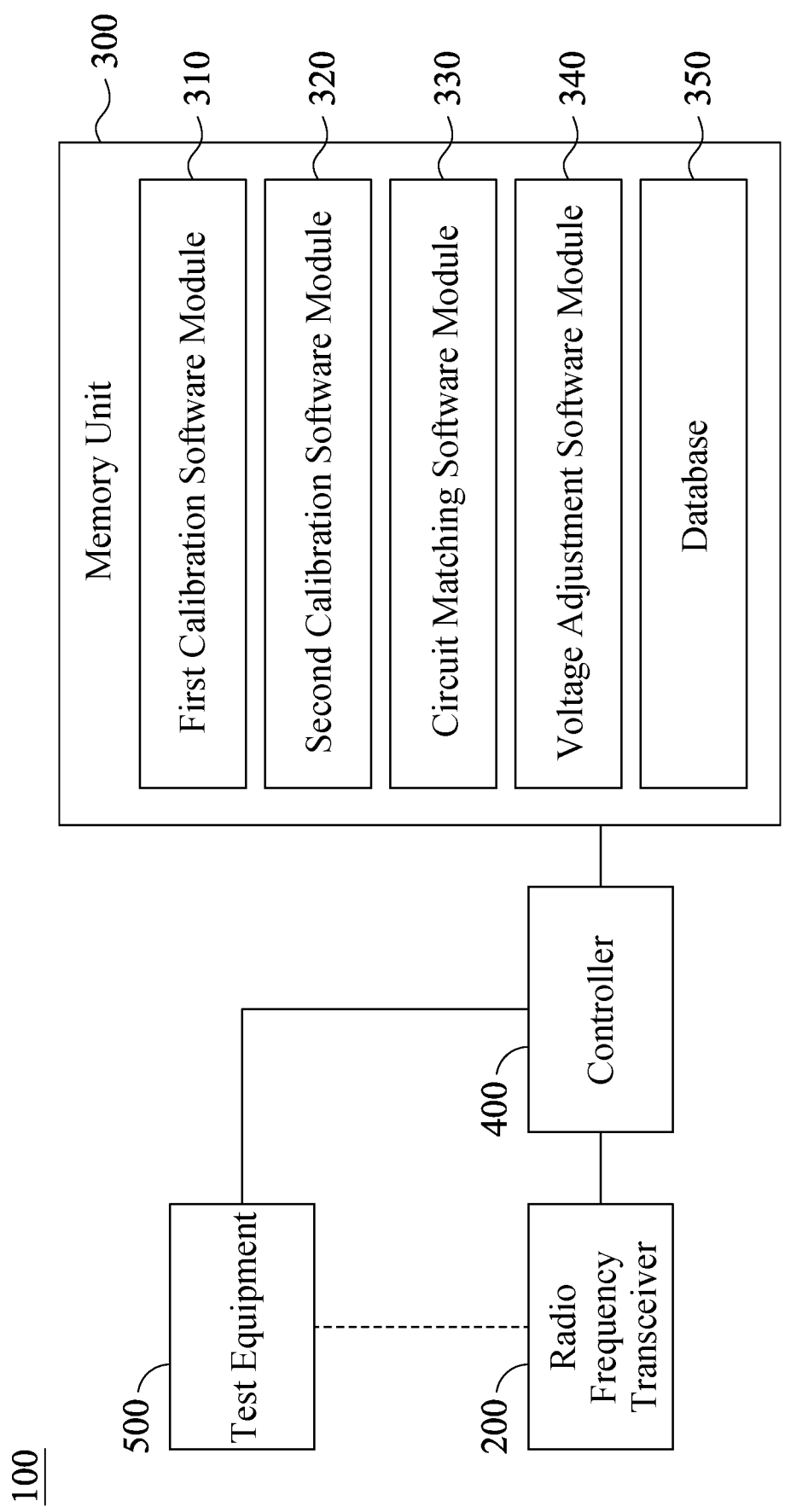
FIG. 1 is a block diagram of a calibration system for a radio frequency transceiver according to a first embodiment of the present disclosure.

FIG. 1 is a block diagram of a calibration system 100 for a radio frequency transceiver (hereinafter referred to as "the calibration system 100") according to a first embodiment of the present disclosure. Referring to FIG. 1, the calibration system 100 includes a radio frequency transceiver 200, a memory unit 300, a controller 400, and a test equipment 500.

The radio frequency transceiver 200 can be, but not limited to a remote radio unit (RRU) used in open radio access network (O-RAN) or a communication device that operates in the 2.4G/5G frequency band.

The memory unit 300 is a machine-readable medium, which can be, but is not limited to a random access memory (RAM), a read-only memory (ROM), a flash memory, a hard disk drive, or a combination thereof, and stores a first calibration software module 310, a second calibration software module 320, a circuit matching software module 330, a voltage adjustment software module 340, and a database 350. Each of the aforementioned software modules can be programmed by any one or more programming languages, and can include, but not limited to object-oriented programming languages (such as Java, C++, C#), general-purpose programming languages (such as C language, Visual Basic), dynamic programming languages (such as Python), or other programming languages. The database 350 stores a plurality of reference calibration models, a plurality of reference parameters, a plurality of reference simulation circuits, and a plurality of reference gate source voltages.

The controller 400 is signally connected to the memory unit 300 and the radio frequency transceiver 200 and is configured to implement a calibration method for a radio frequency transceiver, which includes a first calibration step, a second calibration step, a circuit matching step and a voltage adjustment step. The controller 400 calibrates the radio frequency transceiver 200 through the aforementioned steps, so that the radio frequency signal transmitted by the radio frequency transceiver 200 is linearized. The controller 400 can be a digital signal processor (DSP), a micro processing unit (MPU), a central processing unit (CPU) or other electronic processors. The controller 400 executes the first calibration software module 310, the second calibration software module 320, the circuit matching software module 330 and the voltage adjustment software module 340 respectively to perform the first, second, third and fourth transmission tests on the radio frequency transceiver 200, and reads the data stored in the database 350 from the memory unit 300 to implement the calibration method for the radio frequency transceiver according to the present disclosure.

The test equipment 500 is signally connected to the radio frequency transceiver 200 and the controller 400, and can be a wireless test instrument (such as Keysight E6680A) or a calibration device. The test equipment 500 is used to perform multiplex testing on the radio frequency signals transmitted by the radio frequency transceiver 200 to generate test results, and transmit multiple test results to the controller 400. The controller 400 selects the target calibration model, the target parameter set, the target simulation circuit, and the target gate source voltage from the database 350 based on the test results, and implements and adjusts the internal parameter settings and circuit configuration of the radio frequency transceiver 200 accordingly. Thus, manual testing man-hours can be effectively reduced and the performance of the radio frequency transceiver 200 can be improved. In one embodiment, the controller of the present disclosure can be signally connected to a cloud server, which can also store the aforementioned software modules and database. In another embodiment, the controller and memory unit can be internal components of a smart device and/or computer device. The detailed operation of each step of the calibration method for the radio frequency transceiver according to the present disclosure will be described hereafter in conjunction with the figures.

Figure 2:
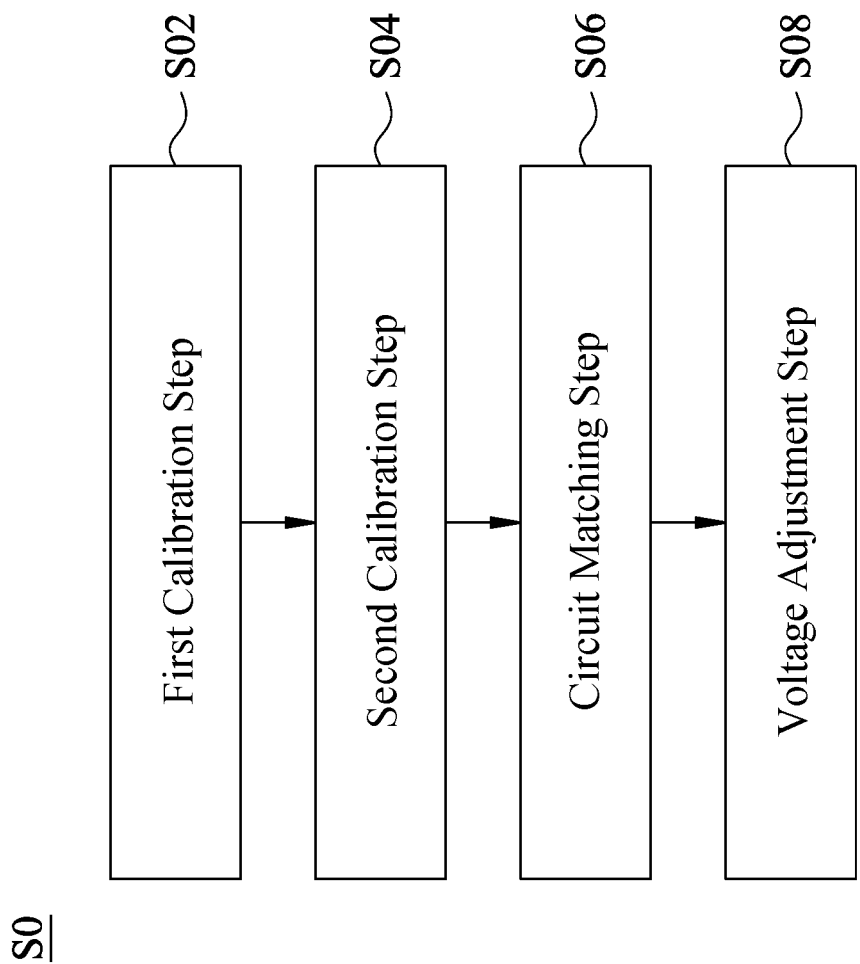
FIG. 2 is a flow chart of a calibration method for a radio frequency transceiver according to a second embodiment of the present disclosure.

FIG. 2 is a flow chart of a calibration method S0 for a radio frequency transceiver (hereinafter referred to as "the calibration method S0") according to a second embodiment of the present disclosure. Referring to FIG. 1 and FIG. 2, the calibration method S0 includes a first calibration step S02, a second calibration step S04, a circuit matching step S06, and a voltage adjustment step S08, and is implemented by the calibration system 100 of the first embodiment. The calibration method S0 uses the controller 400 to execute the first calibration step S02, the second calibration step S04, the circuit matching step S06 and the voltage adjustment step S08 in sequence to calibrate the radio frequency transceiver 200, so that the radio frequency signals transmitted by the radio frequency transceiver 200 are linearized.

The first calibration step S02 includes configuring the controller 400 to execute the first calibration software module 310 to perform a first transmission test on the radio frequency transceiver 200 and generate a plurality of model test results so as to select the target calibration model from the plurality of reference calibration models stored in the database 350 of the memory unit 300. The radio frequency transceiver 200 is then calibrated according to the target calibration model, wherein the target calibration model corresponds to a lowest value among the plurality of model test results.

The second calibration step S04 includes configuring the controller 400 to execute the second calibration software module 320 to perform a second transmission test on the radio frequency transceiver 200 and generate a plurality of parameter test results so as to select the target parameter set from a plurality of reference parameters stored in the database 350 of the memory unit 300. The radio frequency transceiver 200 is then calibrated according to the target parameter set, wherein the target parameter set corresponds to a value set of the plurality of parameter test results. In specific, the plurality of parameter test results can include a plurality of first test results and a plurality of second test results, that is, some of the parameter test results are the first test results, and the remaining parameter test results are the second test results. The plurality of reference parameters can include a plurality of first parameters and a plurality of second parameters, that is, some of the reference parameters are the first parameters, and the remaining reference parameters are the second parameters. In the second calibration step S04, the controller 400 selects a first target parameter from the first parameters, and selects a second target parameter from the second parameters. The first target parameter and the second target parameter form the target parameter set. The first target parameter corresponds to the lowest value among the first test results, and the second target parameter corresponds to the lowest value among the second test results. The lowest value among the first test results and the lowest value among the second test results form the value set.

The circuit matching step S06 includes configuring the controller 400 to execute the circuit matching software module 330 to perform a third transmission test on the radio frequency transceiver 200 and generate a plurality of circuit test results so as to select the target simulation circuit from the plurality of reference simulation circuits stored in the database 350 of the memory unit 300. The target simulation circuit is then matched to the radio frequency transceiver 200, wherein the target simulation circuit corresponds to a lowest value among the plurality of circuit test results.

The voltage adjustment step S08 includes configuring the controller 400 to execute the voltage adjustment software module 340 to perform a fourth transmission test on the radio frequency transceiver 200 and generate a plurality of voltage test results so as to select the target gate source voltage from a plurality of reference gate source voltages stored in the database 350 of the memory unit 300. The target gate source voltage is then applied to the radio frequency transceiver 200, wherein the target gate source voltage corresponds to a lowest value among the plurality of voltage test results.

Hence, the calibration method S0 of the present disclosure uses the controller 400 to automatically and sequentially perform the first, second, third and fourth transmission tests on the radio frequency transceiver 200, and respective selects, from the first, second, third and fourth transmission tests, the target calibration model, target parameter set, target simulation circuit and target gate source voltage that correspond to the lowest value among the test results, and then implements and adjusts the internal parameter setting and circuit configuration of the radio frequency transceiver 200 accordingly, thereby effectively reducing manual testing hours and improving the performance of the radio frequency transceiver 200.

Figure 3:
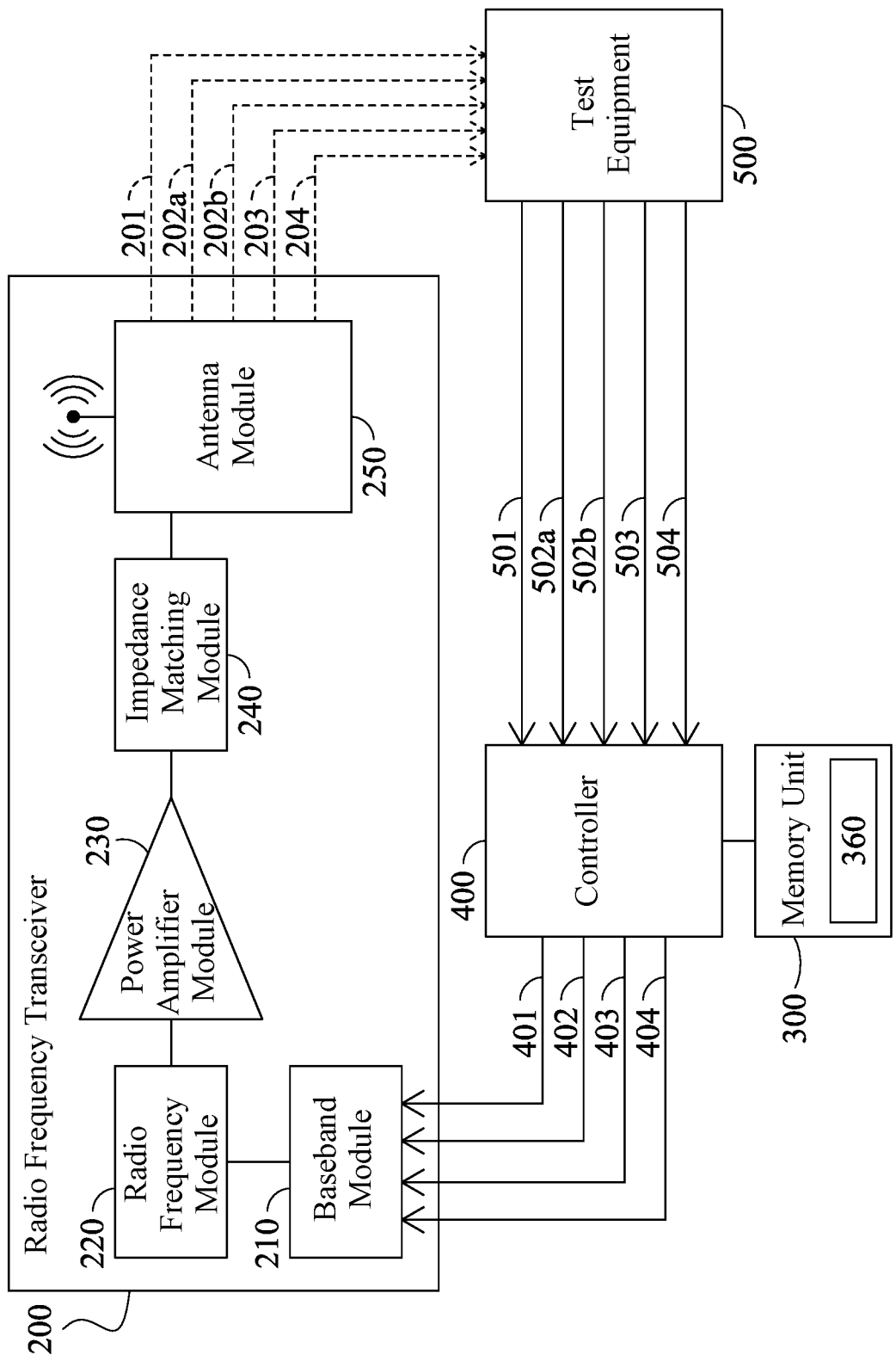
FIG. 3 is a schematic diagram illustrating a test environment of the calibration method for the radio frequency transceiver shown in FIG. 2.
Figures 4, 5:
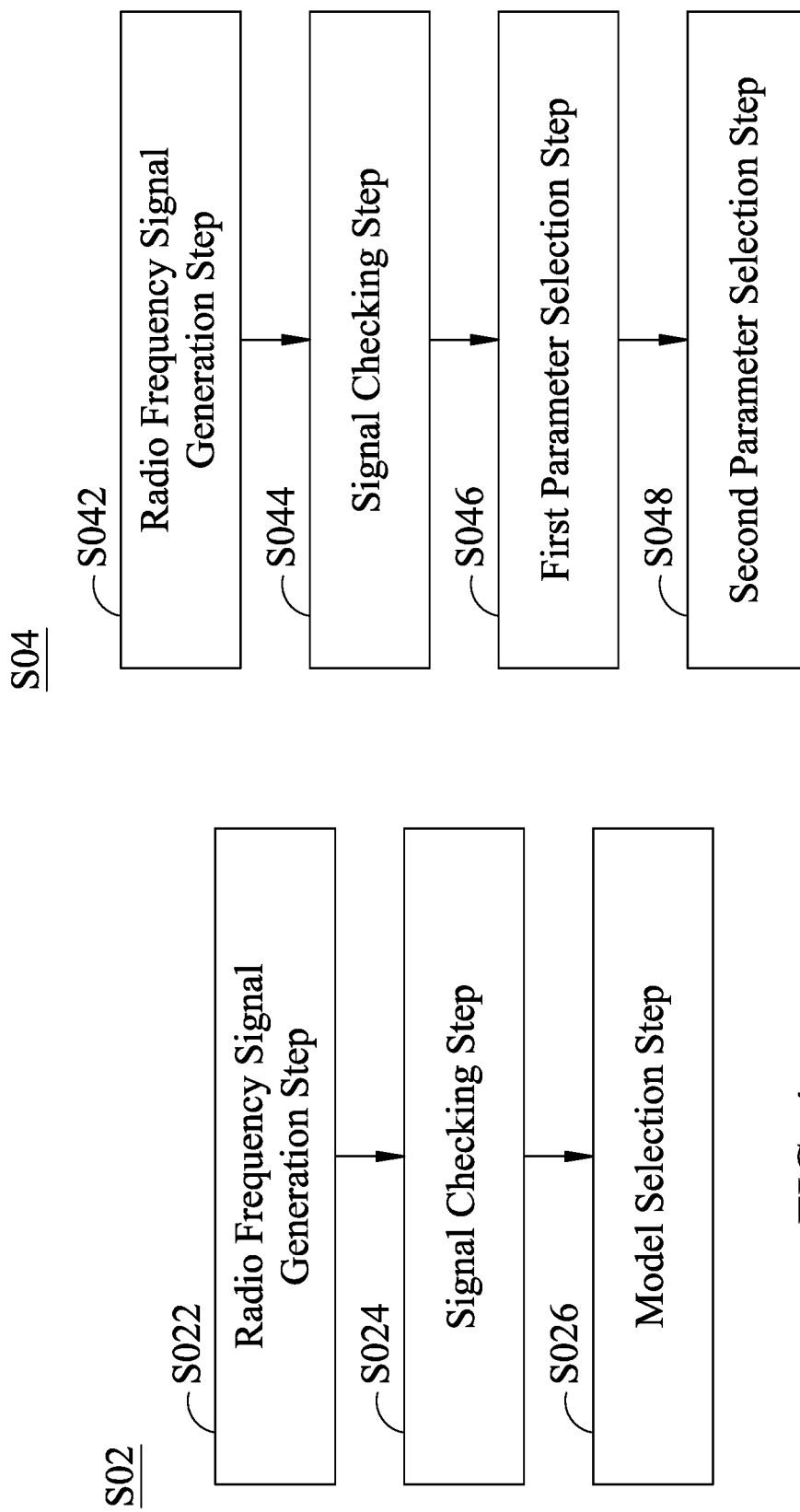
FIG. 4 is a flow chart of a first calibration step in the calibration method for the radio frequency transceiver shown in FIG. 2.
FIG. 5 is a flow chart of a second calibration step in the calibration method for the radio frequency transceiver shown in FIG. 2.

FIG. 3 is a schematic diagram illustrating a test environment of the calibration method S0 shown in FIG. 2, and FIG. 4 is a flow chart of a first calibration step S02 in the calibration method S0 shown in FIG. 2. Referring to FIG. 1 to FIG. 4, the radio frequency transceiver 200 includes a baseband module 210, a radio frequency module 220, a power amplifier module 230, an impedance matching module 240, and an antenna module 250. The radio frequency module 220 is electrically connected to the baseband module 210, the power amplifier module 230 is electrically connected to the radio frequency module 220, the impedance matching module 240 is electrically connected to the power amplifier module 230, and the antenna module 250 is electrically connected to the impedance matching module 240. The first calibration step S02 further includes a radio frequency signal generation step S022, a signal checking step S024, and a model selection step S026.

The radio frequency signal generation step S022 is to configure the controller 400 to transmit the model calibration command 401 to the baseband module 210 during the first transmission test, and control the baseband module 210 through the model calibration command 401 to drive the radio frequency module 220 to generate a plurality of radio frequency signals 201 according to the plurality of reference calibration models. More specifically, after the model calibration command 401 generated by the controller 400 is processed by the baseband module 210, the baseband module 210 transmits a baseband signal to the radio frequency module 220. Then, the radio frequency module 220 converts the baseband signal into an initial radio frequency signal. The power amplifier module 230 is used to amplify the output power of the initial radio frequency signal and convert the initial radio frequency signal into the radio frequency signal 201. The impedance matching module 240 is used to achieve impedance matching between the power amplifier module 230 and the antenna module 250. Finally, the antenna module 250 is used to transmit the radio frequency signal 201 to the test equipment 500.

The signal checking step S024 includes configuring the test equipment 500 to receive and check the radio frequency signals 201 to generate a plurality of model test results 501 corresponding to the plurality of reference calibration models. The model selection step S026 includes configuring the controller 400 to select the lowest value among the plurality of model test results 501, and determine that the reference calibration model corresponding to the lowest value among the plurality of model test results 501 is the target calibration model. Specifically, each reference calibration model stored in the database 350 can be a digital pre-distortion (DPD) calibration model or a combination of DPD calibration parameters. When transmitting the model calibration command 401 to the baseband module 210, the controller 400 will also write different reference calibration models into the radio frequency module 220. Therefore, in the first transmission test, the radio frequency module 220 generates corresponding radio frequency signals 201 according to different reference calibration models. The test equipment 500 generates corresponding model test results 501 according to different radio frequency signals 201, and each model test result 501 can correspond to a value (%) of an error vector magnitude (EVM).

After the first transmission test is completed, the controller 400 selects the reference calibration model with the lowest EVM value as the target calibration model according to the plurality of model test results 501, and then calibrates the radio frequency transceiver 200 according to the target calibration model. In addition, the controller 400 sorts the model test results 501 in a numerical order based on the EVM values to generate a test result list 360, and stores the test result list 360 in the memory unit 300. In other words, the controller 400 records the reference calibration models and their corresponding model test results 501 in the memory unit 300 in a comma-separated value file format (such as, but not limited to, file extensions csv, txt or other file formats), so the user can review the test result list 360 and confirm whether the selected target calibration model is the best among all reference calibration models.

FIG. 5 is a flow chart of the second calibration step S04 in the calibration method S0 shown in FIG. 2. Referring to FIG. 1, FIG. 2, FIG. 3, and FIG. 5, the second calibration step S04 further includes a radio frequency signal generation step S042, a signal checking step S044, a first parameter selection step S046 and a second parameter selection step S048.

The radio frequency signal generation step S042 includes configuring the controller 400 to transmit the parameter calibration command 402 to the baseband module 210 in the second transmission test, and control the baseband module 210 through the parameter calibration command 402 to drive the radio frequency module 220 to respectively generate a plurality of first radio frequency signals 202a and a plurality of second radio frequency signals 202b according to the plurality of first parameters and the plurality of second parameters.

The signal checking step S044 includes configuring the test equipment 500 to receive and check the first radio frequency signals 202a and the second radio frequency signals 202b to respectively generate a plurality of first test results 502a corresponding to the plurality of first parameters and a plurality of second test results 502b corresponding to the plurality of second parameters.

The first parameter selection step S046 includes configuring the controller 400 to select the lowest value among the first test results 502a, and determine that the first parameter corresponding to the lowest value among the first test results 502a is the first target parameter. The second parameter selection step S048 includes configuring the controller 400 to select the lowest value among the second test results 502b, and determine that the second parameter corresponding to the lowest value among the second test results 502b is the second target parameter. In particular, each first parameter stored in the database 350 can be a regularization parameter, and each second parameter stored in the database 350 can be a damping factor. The radio frequency module 220 generates corresponding first radio frequency signals 202a and second radio frequency signals 202b according to different first parameters and second parameters, respectively. The test equipment 500 generates corresponding first test results 502a and second test results 502b respectively according to different first radio frequency signals 202a and second radio frequency signals 202b.

Moreover, the first test results 502a and the second test results 502b each correspond to a value (dB) of an adjacent channel leakage power ratio (ACLR). After the second transmission test is completed, the controller 400 selects the first parameter with the lowest ACLR value as the first target parameter according to the plurality of first test results 502a, and selects the second parameter with the lowest ACLR value as the second target parameter according to the plurality of second test results 502b. Thus, the controller 400 can calibrate the radio frequency transceiver 200 according to the first target parameter and the second target parameter, so that the power leakage of the radio frequency transceiver 200 in adjacent channels is controlled below a specific level, thereby reducing the interference to the radio frequency transceiver 200.

Figure 6:
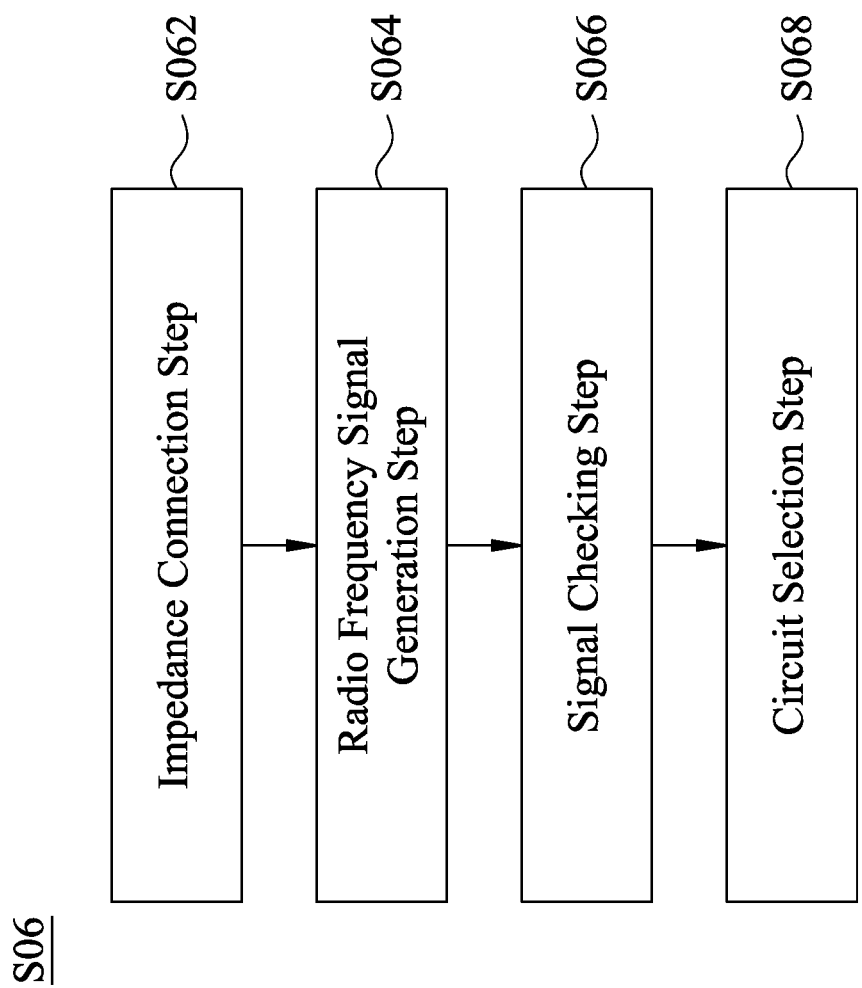
FIG. 6 is a flow chart of a circuit matching step in the calibration method for the radio frequency transceiver shown in FIG. 2.
Figure 7:
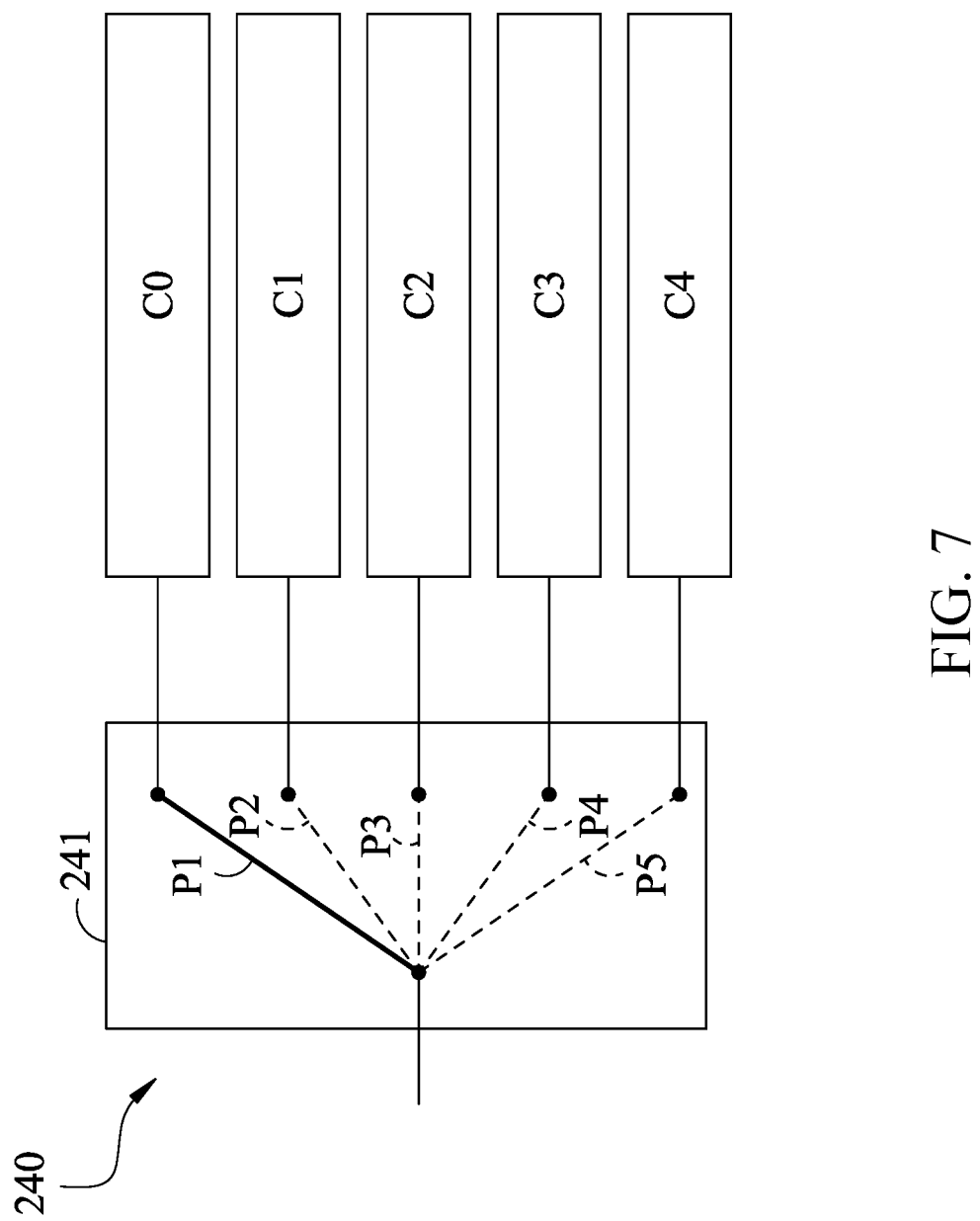
FIG. 7 is a schematic diagram of an impedance matching module in the radio frequency transceiver shown in FIG. 3.

FIG. 6 is a flow chart of the circuit matching step S06 in the calibration method S0 shown in FIG. 2, and FIG. 7 is a schematic diagram of the impedance matching module 240 in the radio frequency transceiver 200 shown in FIG. 3. Referring to FIG. 1, FIG. 2, FIG. 3, FIG. 6, and FIG. 7, the circuit matching step S06 further includes an impedance connection step S062, a radio frequency signal generating step S064, a signal checking step S066 and a circuit selection step S068.

The impedance connection step S062 is to electrically connect the impedance matching module 240 between the output end of the power amplifier module 230 and the input end of the antenna module 250. The impedance matching module 240 includes an antenna switch 241, which can be an SP5T switch and has a plurality of paths P1, P2, P3, P4, and P5, and the paths P1, P2, P3, P4, and P5 are respectively connected to a default simulation circuit C0 and at least one reference simulation circuits C1, C2, C3, C4. In other embodiments, the antenna switch can be, but is not limited to, one or more multi-throw switches (such as SP10T). The configuration of the antenna switch is determined by the user's needs and the number of reference simulation circuits in the database.

The radio frequency signal generation step S064 is to configure the controller 400 to selectively switch the paths P1, P2, P3, P4, and P5 of the antenna switch 241 of the impedance matching module 240 in the third transmission test to connect respectively to the default simulation circuits C0 and the reference simulation circuits C1, C2, C3, C4, and to transmit a circuit calibration command 403 to the baseband module 210 to control the baseband module 210 through the circuit calibration command 403 to drive the radio frequency module 220 to generate a plurality of radio frequency signals 203 according to the default simulation circuit C0 and the reference simulation circuits C1, C2, C3, and C4.

The signal checking step S066 is to configure the test equipment 500 to check the radio frequency signals 203 to generate a circuit test result 503 corresponding to the default simulation circuit C0 and a plurality of circuit test results 503 corresponding to the reference simulation circuits C1, C2, C3, and C4.

The circuit selection step S068 is to configure the controller 400 to select the lowest value among the circuit test results 503, and determine one of the default simulation circuit C0 and the reference simulation circuits C1, C2, C3, and C4 that corresponds to the lowest value among the circuit test results 503 to be the target simulation circuit.

Specifically, in both the first calibration step S02 and the second calibration step S04, the controller 400 switches the antenna switch 241 to the path P1 to connect to the default simulation circuit C0, so that the impedance matching module 240 applies the same impedance value in the first transmission test and the second transmission test, for example 0 ohm. In the circuit matching step S06, each of the reference simulation circuits C1, C2, C3, and C4 stored in the database 350 has different impedance values. For example, the reference simulation circuits C1, C2, C3, and C4 can respectively correspond to any coordinate point in the four quadrants of the Smith chart. The radio frequency module 220 generates corresponding radio frequency signals 203 according to different impedance values (i.e., the default simulation circuit C0 and the reference simulation circuits C1, C2, C3, and C4). The test equipment 500 generates corresponding circuit test results 503 according to different radio frequency signals 203, wherein each circuit test result 503 can correspond to a value (dB) of ACLR. The controller 400 selects one of the default simulation circuit C0 and the reference simulation circuits C1, C2, C3, C4 with the lowest ACLR value as the target simulation circuit according to the plurality of circuit test results 503. Thereby, the controller 400 can match the target simulation circuit to the radio frequency transceiver 200, which can not only reduce the interference received by the radio frequency transceiver 200, but also enable the radio frequency transceiver 200 to achieve impedance matching.

Figure 8:
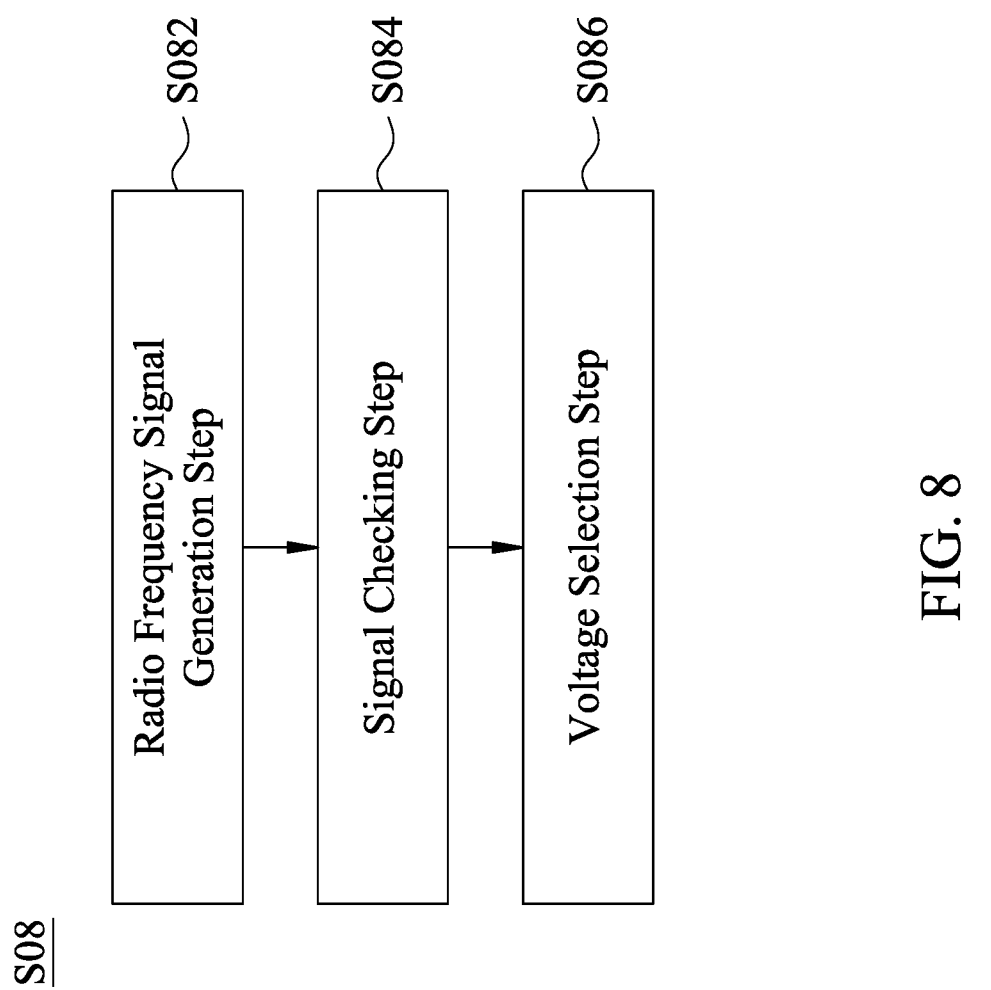
FIG. 8 is a flow chart of a voltage adjustment step in the calibration method for the radio frequency transceiver shown in FIG. 2.

FIG. 8 is a flow chart of the voltage adjustment step S08 in the calibration method S0 shown in FIG. 2. Referring to FIG. 1, FIG. 2, FIG. 3 and FIG. 8, the voltage adjustment step S08 further includes a radio frequency signal generation step S082, a signal checking step S084, and a voltage selection step S086.

The radio frequency signal generation step S082 is to configure the controller 400 to respectively apply the plurality of reference gate source voltages in the database 350 to the power amplifier module 230 in the fourth transmission test, and transmit a voltage calibration command 404 to the baseband module 210. The controller 400 controls the baseband module 210 through the voltage calibration command 404 to drive the radio frequency module 220 to generate a plurality of radio frequency signals 204 according to the reference gate source voltages (that is, the radio frequency module 220 generates the corresponding radio frequency signals 204 according to the different reference gate source voltages applied to the power amplifier module 230).

The signal checking step S084 is to configure the test equipment 500 to receive and check the radio frequency signals 204 to generate a plurality of voltage test results 504 corresponding to the plurality of reference gate source voltages.

The voltage selection step S086 is to configure the controller 400 to select the lowest value among the voltage test results 504, and determine that the reference gate source voltage corresponding to the lowest value among the voltage test results 504 is the target gate source voltage, wherein each voltage test result 504 corresponds to a value of ACLR (dB). After the fourth transmission test is completed, the controller 400 selects the reference gate source voltage with the lowest ACLR value as the target gate source voltage according to the plurality of voltage test results 504. Thereby, the controller 400 can further optimize the radio frequency transceiver 200 by applying the target gate source voltage to the power amplifier module 230 of the radio frequency transceiver 200.

Furthermore, the voltage adjustment step S08 of the calibration method S0 can also be replaced by a current adjustment step, which means that the aforementioned fourth transmission test can be changed from a voltage test to a current test, and the database 350 of the memory unit 300 further stores a plurality of reference current parameters. The current adjustment step includes configuring the controller 400 to execute a current adjustment software module to perform another fourth transmission test on the radio frequency transceiver 200 to generate a plurality of current test results and select a target current parameter from the plurality of reference current parameters so as to apply the target current parameter to the radio frequency transceiver 200, wherein the target current parameter corresponds to a lowest value among one of the current test results. In addition, the current adjustment step can further include a radio frequency signal generation step, a signal checking step and a current selection step.

The aforementioned radio frequency signal generation step is to configure the controller 400 to respectively apply the plurality of reference current parameters in the database 350 to the power amplifier module 230 in the another fourth transmission test, and transmit a current calibration command to the baseband module 210, and then the baseband module 210 is controlled by the current calibration command to drive the radio frequency module 220 to generate a plurality of radio frequency signals according to these reference current parameters. The aforementioned signal checking step is to configure the test equipment 500 to receive and check these radio frequency signals to generate a plurality of current test results corresponding to the plurality of reference current parameters. The aforementioned current selection step is to configure the controller 400 to select the lowest value among these current test results, and determine that the reference current parameter corresponding to the lowest value among these current test results is the target current parameter, wherein each current test result corresponds to an ACLR value (dB). After the other fourth transmission test is completed, the controller can select the reference current parameter with the lowest ACLR value as the target current parameter according to the plurality of current test results. Thereby, the controller 400 can further optimize the radio frequency transceiver 200 not only by applying the target gate source voltage to the power amplifier module 230, but also by applying the target current parameter to the power amplifier module 230.

To sum up, the present disclosure has the following advantages. First, the controller is used to automatically and sequentially conduct multiple transmission tests on the radio frequency transceiver, and gradually select the target calibration model, target parameter set, target simulation circuit and target gate source voltage (or target current parameter), and then implement it and adjust the parameter settings and circuit configuration of the radio frequency transceiver to optimize the radio frequency transceiver. Secondly, it can effectively reduce manual testing man-hours and improve the performance of radio frequency transceivers, and solve the quality issue (performance not as good as expected) of the sold products due to human error in testing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A calibration method for a radio frequency transceiver, the calibration method comprising:
   a first calibration step comprising configuring a controller to execute a first calibration software module for performing a first transmission test on the radio frequency transceiver to generate a plurality of model test results so as to select a target calibration model from a plurality of reference calibration models, and to calibrate the radio frequency transceiver according to the target calibration model, wherein the target calibration model corresponds to a lowest value among the plurality of model test results;
   a second calibration step comprising configuring the controller to execute a second calibration software module for performing a second transmission test on the radio frequency transceiver to generate a plurality of parameter test results so as to select a target parameter set from a plurality of reference parameters, and to calibrate the radio frequency transceiver according to the target parameter set, wherein the target parameter set corresponds to a value set of the plurality of parameter test results; and a circuit matching step comprising configuring the controller to execute a circuit matching software module for performing a third transmission test on the radio frequency transceiver to generate a plurality of circuit test results so as to select a target simulation circuit from a plurality of reference simulation circuits, and to match the radio frequency transceiver according to the target simulation circuit, wherein the target simulation circuit corresponds to a lowest value among the plurality of circuit test results.

2. The calibration method of claim 1, wherein each of the plurality of reference calibration models is a digital predistortion (DPD) calibration model, some of the plurality of reference parameters are respectively regularization parameters, and remaining of the plurality of reference parameters are respectively damping factors.

3. The calibration method of claim 1, wherein the radio frequency transceiver comprises a baseband module and a radio frequency module, and the first calibration step further comprises:

a radio frequency signal generation step comprising configuring the controller to transmit a model calibration command to the baseband module during the first transmission test for controlling the baseband module to drive the radio frequency module to generate a plurality of radio frequency signals according to the plurality of reference calibration models;

a signal checking step comprising configuring a test equipment to check the plurality of radio frequency signals and generate the plurality of model test results corresponding to the plurality of reference calibration models; and a model selection step comprising configuring the controller to select the lowest value among the plurality of model test results and determine one of the plurality of reference calibration models that corresponds to the lowest value among the plurality of model test results to be the target calibration model.

4. The calibration method of claim 3, wherein each of the plurality of model test results corresponds to an error vector magnitude (EVM) value.

5. The calibration method of claim 1, wherein the controller generates a test result list by sorting the plurality of model test results in numerical order after the first transmission test and stores the test result list in a memory unit.

6. The calibration method of claim 1, wherein the plurality of parameter test results comprise a plurality of first test results and a plurality of second test results, the plurality of reference parameters comprise a plurality of first parameters and a plurality of second parameters; and the controller selects a first target parameter from the plurality of first parameters and a second target parameter from the plurality of second parameters, the first target parameter and the second target parameter form the target parameter set, the first target parameter corresponds to a lowest value among the plurality of first test results, the second target parameter corresponds to a lowest value among the plurality of second test results, and the lowest value among the plurality of first test results and the lowest value among the plurality of second test results form the value set.

7. The calibration method of claim 6, wherein the radio frequency transceiver comprises a baseband module and a radio frequency module, and the second calibration step further comprises:

a radio frequency signal generation step comprising configuring the controller to transmit a parameter calibration command to the baseband module during the second transmission test for controlling the baseband module to drive the radio frequency module to respectively generate a plurality of first radio frequency signals and a plurality of second radio frequency signals according to the plurality of first parameters and the plurality of second parameters;

a signal checking step comprising configuring a test equipment to check the plurality of first radio frequency signals and the plurality of second radio frequency signals and generate the plurality of first test results corresponding to the plurality of first parameters and the plurality of second test results corresponding to the plurality of second parameters;

a first parameter selection step comprising configuring the controller to select the lowest value among the plurality of first test results and determine one of the plurality of first parameters that corresponds to the lowest value among the plurality of first test results to be the first target parameter; and a second parameter selection step comprising configuring the controller to select the lowest value among the plurality of second test results and determine one of the plurality of second parameters that corresponds to the lowest value among the plurality of second test results to be the second target parameter.

8. The calibration method of claim 6, wherein each of the plurality of first test results and each of the plurality of second test results correspond respectively to an adjacent channel leakage power ratio (ACLR) value.

9. The calibration method of claim 1, wherein the radio frequency transceiver comprises a baseband module, a radio frequency module, and a power amplifier module, and the circuit matching step further comprises:

an impedance connection step comprising connecting an impedance matching module to an output end of the power amplifier module;

a radio frequency signal generation step comprising configuring the controller to selectively switch a plurality of paths of the impedance matching module during the third transmission test to respectively connect the plurality of reference simulation circuits and transmit a circuit calibration command to the baseband module for controlling the baseband module to drive the radio frequency module to generate a plurality of radio frequency signals according to the plurality of reference simulation circuits;

a signal checking step comprising configuring a test equipment to check the plurality of radio frequency signals and generate the plurality of circuit test results corresponding to the plurality of reference simulation circuits; and a circuit selection step comprising configuring the controller to select the lowest value among the plurality of circuit test results and determine one of the plurality of reference simulation circuits that corresponds to the lowest value among the plurality of circuit test results to be the target simulation circuit.

10. The calibration method of claim 9, wherein each of the plurality of circuit test results corresponds to an adjacent channel leakage power ratio (ACLR) value.

11. The calibration method of claim 1, further comprising:
a voltage adjustment step comprising configuring the controller to execute a voltage adjustment software module for performing a fourth transmission test on the radio frequency transceiver to generate a plurality of voltage test results so as to select a target gate source voltage from a plurality of reference gate source voltages, and apply the target gate source voltage to the radio frequency transceiver, wherein the target gate source voltage corresponds to a lowest value among the plurality of voltage test results;
wherein the controller executes the first calibration step, the second calibration step, the circuit matching step, and the voltage adjustment step in sequence.

12. The calibration method of claim 11, wherein the radio frequency transceiver comprises a baseband module, a radio frequency module, and a power amplifier module, and the voltage adjustment step further comprises:
a radio frequency signal generation step comprising configuring the controller to apply the plurality of reference gate source voltages to the power amplifier module respectively during the fourth transmission test and transmit a voltage calibration command to the baseband module for controlling the baseband module to drive the radio frequency module to generate a plurality of radio frequency signals according to the plurality of reference gate source voltages;
a signal checking step comprising configuring a test equipment to check the plurality of radio frequency signals and generate the plurality of voltage test results corresponding to the plurality of reference gate source voltages; and
a voltage selection step comprising configuring the controller to select the lowest value among the plurality of voltage test results and determine one of the plurality of reference gate source voltages that corresponds to the lowest value among the plurality of voltage test results to be the target gate source voltage.

13. A calibration system for a radio frequency transceiver, the calibration system comprising:
a radio frequency transceiver;
a memory unit for storing a first calibration software module, a second calibration software module, a circuit matching software module, a plurality of reference calibration models, a plurality of first parameters, a plurality of second parameters, and a plurality of reference simulation circuits; and
a controller connected to the memory unit and the radio frequency transceiver and configured to perform a first calibration step, a second calibration step, and a circuit matching step;
wherein, in the first calibration step, the controller executes the first calibration software module for performing a first transmission test on the radio frequency transceiver to generate a plurality of model test results, selects a target calibration model from the plurality of reference calibration models, and calibrates the radio frequency transceiver according to the target calibration model, wherein the target calibration model corresponds to a lowest value among the plurality of model test results;
wherein, in the second calibration step, the controller executes the second calibration software module for performing a second transmission test on the radio frequency transceiver to generate a plurality of first test results and a plurality of second test results, selects a first target parameter from the plurality of first parameters and a second target parameter from the plurality of second parameters, and calibrates the radio frequency transceiver according to the first target parameter and the second target parameter, wherein the first target parameter corresponds to a lowest value among the plurality of first test results, and the second target parameter corresponds to a lowest value among the plurality of second test results; and
wherein, in the circuit matching step, the controller executes the circuit matching software module for performing a third transmission test on the radio frequency transceiver to generate a plurality of circuit test results, selects a target simulation circuit from the plurality of reference simulation circuits, and matches the target simulation circuit to the radio frequency transceiver, wherein the target simulation circuit corresponds to a lowest value among the plurality of circuit test results.

14. The calibration system of claim 13, wherein each of the plurality of reference calibration models is a digital pre-distortion (DPD) calibration model, each of the plurality of first parameters is a regularization parameter, and each of the plurality of second parameters is a damping factor.

15. The calibration system of claim 13, further comprising:
a test equipment connected to the radio frequency transceiver and the controller;
wherein the radio frequency transceiver comprises a baseband module and a radio frequency (RF) module connected to the baseband module, and the first calibration step further comprises a radio frequency signal generation step, a signal checking step, and a model selection step;
wherein, in the radio frequency signal generation step, the controller transmits a model calibration command to the baseband module during the first transmission test, controls the baseband module through the model calibration command to drive the radio frequency module to generate a plurality of radio frequency signals according to the plurality of reference calibration models;
wherein, in the signal checking step, the test equipment checks the plurality of radio frequency signals and generates the plurality of model test results corresponding to the plurality of reference calibration models; and
wherein, in the model selection step, the controller selects the lowest value among the plurality of model test results and determines one of the plurality of reference calibration models that corresponds to the lowest value among the plurality of model test results to be the target calibration model;
wherein, each of the plurality of model test results corresponds to an error vector magnitude (EVM) value.

16. The calibration system of claim 13, wherein the controller generates a test result list by sorting the plurality of model test results in numerical order after the first transmission test and stores the test result list in the memory unit.

17. The calibration system of claim 13, further comprising:
a test equipment connected to the radio frequency transceiver and the controller;
wherein the radio frequency transceiver comprises a baseband module and a radio frequency module connected to the baseband module, and the second calibration step further comprises a radio frequency signal generation step, a signal checking step, a first parameter selection step, and a second parameter selection step;

wherein, in the radio frequency signal generation step, the controller transmits a parameter calibration command to the baseband module during the second transmission test and controls the baseband module through the parameter calibration command to drive the radio frequency module to respectively generate a plurality of first radio frequency signals and a plurality of second radio frequency signals according to the plurality of first parameters and the plurality of second parameters;

wherein, in the signal checking step, the test equipment checks the plurality of first radio frequency signals and the plurality of second radio frequency signals and respectively generates the plurality of first test results corresponding to the plurality of first parameters and the plurality of second test results corresponding to the plurality of second parameters;

wherein, in the first parameter selection step, the controller selects the lowest value among the plurality of first test results and determines the one of the plurality of first parameters that corresponds to the lowest value among the plurality of first test results to be the first target parameter; and wherein, in the second parameter selection step, the controller selects the lowest value among the plurality of second test results and determines the one of the plurality of second parameters that corresponds to the lowest value among the plurality of second test results to be the second target parameter;

wherein each of the plurality of first test results corresponds to an adjacent channel leakage power ratio (ACLR) value, and each of the plurality of second test results corresponds to an adjacent channel leakage power ratio (ACLR) value.

18. The calibration system of claim 13, further comprising:

a test equipment connected to the radio frequency transceiver and the controller;

wherein the radio frequency transceiver comprises:
a baseband module;
a radio frequency module connected to the baseband module;
a power amplifier module connected to the radio frequency module; and
an impedance matching module connected to the power amplifier module and comprising a plurality of paths;

wherein the circuit matching step further comprises a radio frequency signal generation step, a signal checking step, and a circuit selection step;

wherein, in the radio frequency signal generation step, the controller selectively switches the plurality of paths in the impedance matching module to connect respectively to the plurality of reference simulation circuits during the third transmission test, transmits a circuit calibration command to the baseband module, and controls the baseband module through the circuit calibration command to drive the radio frequency module to generate a plurality of radio frequency signals according to the plurality of reference simulation circuits;

wherein, in the signal checking step, the test equipment checks the plurality of radio frequency signals and generates the plurality of circuit test results corresponding to the plurality of reference simulation circuits; and wherein, in the circuit selection step, the controller selects the lowest value among the plurality of circuit test results and determines one of the plurality of reference simulation circuits that corresponds to the lowest value among the plurality of circuit test results to be the target simulation circuit;

wherein each of the plurality of circuit test results corresponds to an adjacent channel leakage power ratio (ACLR) value.

19. The calibration system of claim 13, wherein the controller is configured to perform a voltage adjustment step, and in the voltage adjustment step, the controller executes a voltage adjustment software module for performing a fourth transmission test on the radio frequency transceiver to generate a plurality of voltage test results, selects a target gate source voltage from a plurality of reference gate source voltages, and applies the target gate source voltage to the radio frequency transceiver, and the target gate source voltage corresponds to a lowest value among the plurality of voltage test results.

20. The calibration system of claim 19, further comprising:

a test equipment connected to the radio frequency transceiver and the controller;

wherein the radio frequency transceiver comprises:
a baseband module;
a radio frequency module connected to the baseband module; and
a power amplifier module connected to the radio frequency module;

wherein the voltage adjustment step further comprises a radio frequency signal generation step, a signal checking step, and a voltage selection step;

wherein, in the radio frequency signal generation step, the controller apply the plurality of reference gate source voltages to the power amplifier module respectively during the fourth transmission test, transmits a voltage calibration command to the baseband module, and controls the baseband module through the voltage calibration command to drive the radio frequency module to generate a plurality of radio frequency signals according to the plurality of reference gate source voltages;

wherein, in the signal checking step, the test equipment checks the plurality of radio frequency signals and generates the plurality of voltage test results corresponding to the plurality of reference gate source voltages; and wherein, in the voltage selection step, the controller selects the lowest value among the plurality of voltage test results and determines one of the plurality of reference gate source voltages that corresponds to the lowest value among the plurality of voltage test results to be the target gate source voltage.

* * * * *